US008656469B2

(12) United States Patent
Ramaswamy et al.

(10) Patent No.: US 8,656,469 B2
(45) Date of Patent: Feb. 18, 2014

(54) METHODS AND APPARATUS FOR DYNAMIC USER AUTHENTICATION USING CUSTOMIZABLE CONTEXT-DEPENDENT INTERACTION ACROSS MULTIPLE VERIFICATION OBJECTS

(75) Inventors: Ganesh N. Ramaswamy, Ossining, NY (US); Ran Zilca, Briarcliff Manor, NY (US); Oleg Alecksandrovich, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/348,165

(22) Filed: Jan. 11, 2012

(65) Prior Publication Data
US 2012/0131658 A1 May 24, 2012

Related U.S. Application Data

(62) Division of application No. 10/283,729, filed on Oct. 30, 2002, now Pat. No. 8,171,298.

(51) Int. Cl.
*G06F 7/04* (2006.01)
*G06F 21/00* (2013.01)
*G06F 15/16* (2006.01)
*H04L 29/06* (2006.01)

(52) U.S. Cl.
USPC .............. 726/7; 726/1; 726/2; 726/5; 726/21; 713/176; 713/182

(58) Field of Classification Search
None
See application file for complete search history.

(56) References Cited

U.S. PATENT DOCUMENTS

| 6,256,737 | B1 | 7/2001 | Bianco et al. | |
|---|---|---|---|---|
| 7,091,826 | B2 | 8/2006 | Hayakawa | |
| 7,305,562 | B1 * | 12/2007 | Bianco et al. | 713/186 |
| 2002/0087894 | A1 * | 7/2002 | Foley et al. | 713/202 |
| 2003/0061520 | A1 * | 3/2003 | Zellers et al. | 713/202 |
| 2003/0084300 | A1 | 5/2003 | Koike | |
| 2003/0145220 | A1 * | 7/2003 | Cossel et al. | 713/200 |
| 2003/0154406 | A1 * | 8/2003 | Honarvar et al. | 713/201 |
| 2003/0233546 | A1 * | 12/2003 | Blom | 713/168 |

FOREIGN PATENT DOCUMENTS

| EP | 1 176 489 A2 | 1/2002 |
|---|---|---|
| GB | 2 342 744 A | 4/2000 |
| JP | 2000122975 | 4/2000 |
| JP | 2002-269050 A | 9/2002 |
| JP | 2003-32652 A | 1/2003 |

(Continued)

*Primary Examiner* — Nathan Flynn
*Assistant Examiner* — Trang Doan
(74) *Attorney, Agent, or Firm* — Anne V. Dougherty; Ryan, Mason & Lewis, LLP

(57) ABSTRACT

An authentication framework is provided which enables dynamic user authentication that combines multiple authentication objects using a shared context and that permits customizable interaction design to suit varying user preferences and transaction/application requirements. For example, an automated technique for user authentication comprises the following steps/operations. First, user input is obtained. At least a portion of the user input is associated with two or more verification objects. Then, the user is verified based on the two or more verification objects in accordance with at least one verification policy operating on a context shared across the two or more verification objects. The user authentication technique of the invention may preferably be implemented in a flexible, distributed architecture comprising at least one client device coupled to at least one verification server. The client device and the verification server may operate together to perform the user authentication techniques of the invention.

18 Claims, 8 Drawing Sheets

(56) References Cited

FOREIGN PATENT DOCUMENTS

| JP | 2003-132160 A | 5/2003 |
| JP | 2003-167854 A | 6/2003 |
| WO | WO0054214 A1 | 9/2000 |
| WO | WO 01/90859 A1 | 11/2001 |

* cited by examiner

```
<VERIFICATION_OBJECT_BASE>

<OBJECT NAME="DOB"
      ENGINE="KNOWLEDGE"           ← 302
      TYPE="QA"
      PROMPT="WHAT IS YOUR DATE OF BIRTH?"
      PERPLEXITY="10"></OBJECT>

<OBJECT NAME="CALLER_ID"
      ENGINE="TELEPHONY"
      TYPE="CALLER_ID"             ← 304
      PROMPT=NONE
      PERPLEXITY="20"></OBJECT>

<OBJECT NAME="VOICE_PRINT"
      ENGINE="VOICEPRINT"          ← 306
      PROMPT=NONE
      PERPLEXITY="1000"></OBJECT>

<OBJECT NAME="COLOR"
      ENGINE="KNOWLEDGE"           ← 308
      TYPE="QA"
      PROMPT="WHAT IS YOUR FAVORITE COLOR?"
      PERPLEXITY="5"></OBJECT>

<OBJECT NAME="CAR_COLOR"         ← 310
      INHERIT_FROM="COLOR"
      PROMPT="WHAT IS THE COLOR OF YOUR CAR?"></OBJECT>

<OBJECT NAME="CUR_BALANCE"
      ENGINE="KNOWLEDGE"           ← 312
      TYPE="APP_NUM"
      PROMPT="WHAT IS CURRENTLY THE APPROXIMATE
                              BALANCE IN YOUR ACCOUNT?">
      PERPLEXITY="100"</OBJECT>

<OBJECT NAME="LAST_TRANSACTION_DATE"
      ENGINE="KNOWLEDGE"           ← 314
      TYPE="APP_STR"
      PROMPT="WHAT IS THE DATE OF YOUR LAST TRANSACTION?"
      PERPLEXITY="100"</OBJECT>

</VERIFICATION_OBJECT_BASE>
```

FIG. 3

```
<USER_MODEL NAME="JOHN_DOE">
 <OBJECTS>
  <OBJECT NAME="CALLER_ID"
          ANSWER="914-945-3000"
          PREFERENCE="20"></OBJECT>
  <OBJECT NAME="DOB"
          ANSWER="08-02-1975"
          PREFERENCE="20"></OBJECT>
  <OBJECT NAME="COLOR"
          ANSWER="BLUE"
          PREFERENCE="10"></OBJECT>
  <OBJECT NAME="CAR_COLOR"
          ANSWER="RED"
          ANSWER="BEIGE"
          PREFERENCE="30"></OBJECT>
  <OBJECT NAME="VOICE_PRINT"
          FILENAME="JOHN_DOE.VPR"
          PREFERENCE="30"></OBJECT>
  <OBJECT NAME="CUR_BALANCE"
          PREFERENCE="10"></OBJECT>
  <OBJECT NAME="LAST_TRANSACTION_DATE"
          PREFERENCE="10"></OBJECT>
 </OBJECTS>
</USER_MODEL>
```

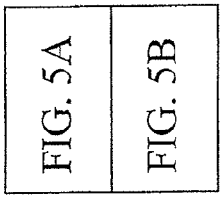

```
1.  <POLICY NAME="SIMPLE_BANK_POLICY">
2.
3.   <VARIABLES>
4.    <DEFAULT VAR="CURBALANCE"           VAL="-1"          TYPE="FLOAT"></DEFAULT>
5.    <DEFAULT VAR="MINVOICEPRINTSCORE"   VAL="0"           TYPE="FLOAT"></DEFAULT>
6.    <DEFAULT VAR="LASTTRANSACTIONDATE"  VAL="01-01-2100"  TYPE="STRING"></DEFAULT>
7.   </VARIABLES>
8.
9.   <CONDITIONS>
10.   <CONDITION NAME="ONE_OK"             EXP=" CUROBJECTNUM = 1 & CURWRONGNUM=0" ></CONDITION>
11.   <CONDITION NAME="TWO_OK_ONE_BAD"     EXP=" CUROBJECTNUM = 3 & CURWRONGNUM=1" ></CONDITION>
12.   <CONDITION NAME="TWO_BAD"            EXP=" CURWRONGNUM = 2"></CONDITION>
13.   <CONDITION NAME="TWO_OK_NO_BAD"      EXP=" CUROBJECTNUM = 2 & CURWRONGNUM=0" ></CONDITION>
14.   <CONDITION NAME="THREE_OK_ONE_BAD"   EXP=" CUROBJECTNUM = 4 & CURWRONGNUM=1" ></CONDITION>
15.   <CONDITION NAME="CUR_BALANCE_TEST"   EXP=" _ANSWERFLOAT > CURBALANCE*0.95 &
                                                _ANSWERFLOAT < CURBALANCE*1.05" ></CONDITION>
16.
17.   <CONDITION NAME="VOICE_PRINT_TEST"   EXP=" _ANSWERFLOAT > MINVOICEPRINTSCORE"></CONDITION>
18.   <CONDITION NAME="DATE_TEST"          EXP=" _ANSWERSTRING = LASTTRANSACTIONDATE" ></CONDITION>
19.  </CONDITIONS>
20.
21.  <STATES>
22.   <STATE NAME="_ACCEPT_">
23.   </STATE>
24.   <STATE NAME="_REJECT_">
25.   </STATE>
```

```
26. <STATE NAME="_START_">
27.   <OBJECTS>
28.     <OBJECT NAME="CALLER_ID"    WEIGHT="100"></OBJECT>
29.     <OBJECT NAME="DOB"          WEIGHT="10"></OBJECT>
30.     <OBJECT NAME="CAR_COLOR"    WEIGHT="10"></OBJECT>
31.   </OBJECTS>
32.   <SWITCH>
33.     <CASE CONDITION="ONE_OK"         TARGET="ACCOUNT" ></CASE>
34.     <CASE CONDITION="TWO_OK_ONE_BAD" TARGET="ACCOUNT" ></CASE>
35.     <CASE CONDITION="TWO_BAD"        TARGET="_REJECT_"></CASE>
36.   </SWITCH>
37. </STATE>
38.
39. <STATE NAME="ACCOUNT">
40.   <OBJECTS>
41.     <OBJECT NAME="VOICE_PRINT"           CONDITION="VOICE_PRINT_TEST"></OBJECT>
42.     <OBJECT NAME="CUR_BALANCE"           CONDITION="CUR_BALANCE_TEST"></OBJECT>
43.     <OBJECT NAME="LAST_TRANSACTION_DATE" CONDITION="DATE_TEST"       ></OBJECT>
44.   </OBJECTS>
45.   <SWITCH>
46.     <CASE CONDITION="TWO_OK_NO_BAD"    TARGET="_ACCEPT_"></CASE>
47.     <CASE CONDITION="THREE_OK_ONE_BAD" TARGET="_ACCEPT_"></CASE>
48.     <CASE CONDITION="TWO_BAD"          TARGET="_REJECT_"></CASE>
49.   </SWITCH>
50. </STATE>
51. </STATES>
52. </POLICY>
```

FIG. 5B

METHODS AND APPARATUS FOR DYNAMIC USER AUTHENTICATION USING CUSTOMIZABLE CONTEXT-DEPENDENT INTERACTION ACROSS MULTIPLE VERIFICATION OBJECTS

CROSS-REFERENCE TO RELATED APPLICATION(S)

This application is a Divisional of U.S. application Ser. No. 10/283,729 filed on Oct. 30, 2002, now U.S. Pat. No. 8,171,298, the disclosure of which is incorporated herein by reference.

FIELD OF THE INVENTION

The present invention relates to authentication techniques and, more particularly, to techniques for providing dynamic user authentication using customizable context-dependent interaction across multiple verification objects.

BACKGROUND OF THE INVENTION

Authenticating the identity claim of a user is an important step in ensuring the security of systems, networks, services and facilities, both for physical and for logical access. Existing user authentication is often performed on the basis of a user's knowledge of a single verification object, e.g., a password or a personal identification number (PIN). Existing user authentication may also be performed on the basis of possession of a single verification object, e.g., a key or a card. Other existing authentication techniques include the use of a single biometric feature as the verification object, e.g., a fingerprint, a voiceprint, an iris scan or a face scan.

Verification is typically done by comparing the verification object obtained from the user at the time of attempted access to previously stored objects. Thus, in the case of a fingerprint, if the fingerprint obtained from the user at the time of attempted access matches a prestored fingerprint (presumably taken from the user at some earlier time), then access is granted. If no match is found, then access is denied.

However, these existing authentication techniques have many drawbacks. For example, keys or passwords may be stolen or biometric features may be compromised, e.g., using false fingerprints.

More recent techniques attempt to use more than one biometric recognition technique, such as face and voice print recognition. However, such techniques typically acquire and analyze each biometric feature sequentially and independently and merely combine the final outputs in a predetermined static manner, and thus do not utilize any interaction between biometrics.

Further, existing authentication techniques fail to provide enough flexibility to address various user-specific, transaction-specific or application-specific constraints or requirements. For example, a user-specific constraint may be that a user with a cut on his finger may not be able to use a fingerprint recognition system. A transaction-specific constraint may be that a million dollar transaction should require a higher degree of authentication as opposed to a ten dollar transaction. An application-specific constraint may be that security questions based on a banking application may not be suitable for a travel application. Existing authentication approaches are just not flexible enough to handle these types of constraints or requirements.

Accordingly, given the growing interest in security and authentication and the deficiencies of existing authentication systems, there is a clear need for an improved authentication framework that provides a high degree of flexibility, accuracy, convenience and/or robustness.

SUMMARY OF THE INVENTION

The present invention provides an improved authentication framework affording greater flexibility, accuracy, convenience and robustness as compared to existing authentication frameworks. This is accomplished, for example, by enabling dynamic user authentication that combines multiple authentication objects using a shared context and that permits customizable interaction design to suit varying user preferences and transaction/application requirements. Such a framework advantageously provides a high degree of flexibility, accuracy, convenience and robustness.

In one aspect of the invention, an automated technique for user authentication comprises the following steps/operations. First, user input is obtained. At least a portion of the user input is associated with two or more verification objects. Then, the user is verified based on the two or more verification objects in accordance with at least one verification policy operating on a context shared across the two or more verification objects.

The user verification step/operation is preferably performed in accordance with two or more verification engines which are respectively responsive to the two or more verification objects. The two or more verification engines may respectively compare the two or more verification objects to at least one user model. The user model may be previously generated based on data obtained in accordance with a user enrollment session.

Further, the context that is shared across the two or more verification objects may comprise one or more variables associated with the user verification step/operation. For example, the context variables may represent one or more of: (i) a user name; (ii) a current state in the at least one verification policy; (iii) a history pertaining to the two or more verification objects; (iv) application-specific requirements; (v) user-specific requirements; and (vi) physical or logical variables. Still further, the two or more verification objects may represent object types that may be used to verify identity of the user, knowledge of the user, and possessions of the user.

In another aspect of the invention, the user authentication technique is customizable in that the technique may comprise the steps/operations of adding, modifying and/or deleting a verification policy, a verification object type, a user model, and/or a variable associated with the context. These tasks may be accomplished in an administrative session.

In yet another aspect of the invention, the user authentication technique is implemented in a flexible, distributed architecture comprising at least one client device coupled to at least one verification server. The client device and the verification server may operate together to perform the inventive user authentication techniques described herein.

A communication interface between the client device and the verification server may be implemented in accordance with Extensible Markup Language (XML). Such a communication interface between the client device and the verification server may support a verification session, an enrollment session and/or an administrative session.

In a further aspect of the invention, the user authentication technique comprises the use of at least one verification policy and verification means operative to verify a user in accordance with the at least one verification policy, wherein the at least one verification policy is implementable in accordance with the verification means as a state machine. It is to be understood that verification means, as referred to herein, may be realized in a number of implementations, e.g., a verification module which can be implemented in hardware, software, and/or combinations thereof.

In yet another aspect of the invention, the user authentication technique comprises the use of at least one verification object and verification means operative to verify a user in accordance with the at least one verification object, wherein the at least one verification object is one of: (i) usable for verification without the use of an associated verification engine; (ii) not required to be previously enrolled with user data relating to the at least one verification object; (iii) dynamic; (iv) implicit; (v) able to inherit at least one property from another object; (vi) characterized by multiple inputs; (vii) weighted; and (viii) able to be manipulated. By implicit, it is preferably meant that the object requires no user input, e.g., a caller-id based object. By inheritance, it is preferably meant that one object can inherit a property from another object, e.g., if an object is called color, a new object can be created called car color that inherits properties from the parent object (color).

In yet another aspect of the invention, the user authentication technique comprises the use of at least one user model and verification means operative to verify a user in accordance with the at least one user model, wherein the at least one user model is one of: (i) representative of one or more user preferences; and (ii) able to be modified for use in subsequent user verification.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating an exemplary specification of multiple verification objects, according to one embodiment of the invention;

FIG. 4 is a diagram illustrating an exemplary specification of user models including multiple verification objects, according to one embodiment of the invention;

FIG. 5 is a diagram illustrating an exemplary specification of customizable verification policies utilizing multiple verification objects for dynamic user authentication, according to one embodiment of the invention;

DETAILED DESCRIPTION OF PREFERRED EMBODIMENTS

Figure 1:
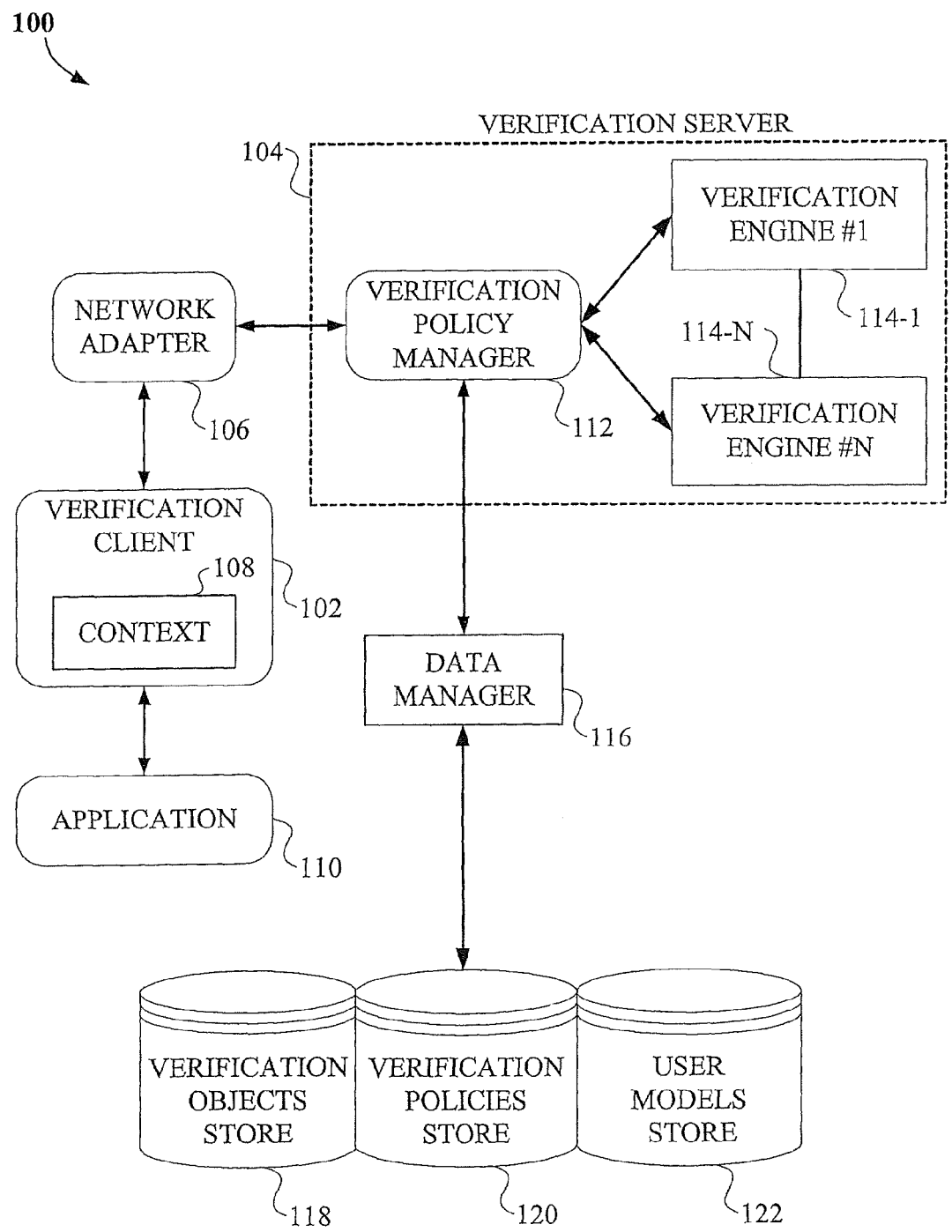
FIG. 1 is a block diagram illustrating a client-server architecture of an authentication system for implementing customizable verification using multiple verification objects, according to one embodiment of the invention.

The following description will illustrate the invention using an exemplary client-server system architecture. It should be understood, however, that the invention is not limited to use with any particular system architecture. The invention is instead more generally applicable to any system architecture in which it is desirable to provide an authentication framework that provides a high degree of flexibility, accuracy, convenience and/or robustness. That is, the techniques of the present invention may be implemented on a single computer system or on multiple computer systems coupled by a suitable network, examples of which will be described below.

As will be illustratively explained in detail herein, the present invention provides a new programming model that allows full customization of the authentication process to address a wide variety of user-specific, transaction-specific, application-specific constraints and other related requirements, including multiple verification objects.

The invention further enables a dynamic user authentication process that can respond in real-time to changes in the interaction between the user and the system. The highly flexible architecture permits new verification objects and verification policies to be added at anytime. A common context and associated data structures are included, such that the entire authentication interaction can operate on this shared context.

In one embodiment, the interaction design is based on authentication policies implemented as a statistical state machine using XML (eXtensible Markup Language). In addition, there is a file that specifies the relevant authentication objects (e.g., questions to be asked, actions to be performed, etc.) and files that contain user profiles (e.g., user selected authentication objects and correct responses, user preferences, etc.) both of which may also be implemented using XML.

The entire authentication interaction is determined dynamically based on the authentication policy in effect (selected based on user preferences and transaction or application requirements), using operations on the shared context, further utilizing the authentication objects in effect and the user profile of interest.

Such an approach provides significantly improved authentication capabilities as compared with existing authentication systems, and ensures a very high degree of accuracy, flexibility, convenience and robustness.

Furthermore, as will be illustratively explained in detail below, the authentication techniques of the present invention utilize the following components: (1) verification objects and verification engines; (2) verification policies and a verification policy manager; and (3) user models.

Verification objects are objects that can be used for the purpose of verifying the identity of users, such as the user's biometric characteristics (e.g., voiceprint, fingerprint, face scan, iris scan, handwritten signature, keyboard dynamics, etc.), the user's knowledge (e.g., passwords, passphrases, answers to personal questions, etc.), and the user's possessions (e.g., keys, cards, tokens, certificates, cellular telephone or home telephone transmitting caller-id information, personal or handheld computer with client software, user's location, etc.). It is to be understood that the lists of example objects above are not intended to be exhaustive and, further, that the invention is not intended to be limited to any particular objects.

Verification engines are used to match the verification objects with the representation stored in a user model. Examples of verification engines include a fingerprint recognition system to match the user's fingerprint, a conversational system to evaluate spoken answers to questions such as a voice response system, a conversational system such as a speech or voiceprint recognition system (that may include natural understanding techniques) to extract and recognize a user's spoken utterances (wherein the conversational system may also include a speech synthesis system for generating synthesized questions and prompts), a caller-id recognition system to extract and match the user's telephone number, a badge reader to scan the user's badge or card, a PIN confirmation system to confirm a user's PIN, a face recognition system to extract and match a user's face scan, an iris recognition system to extract and match a user's iris scan, a handwriting recognition system to recognize a user's handwriting, a keyboard dynamic recognizer to match a user's keyboard dynamics, as well as other modality-specific engines discussed herein and/or may otherwise be known. It is to be understood that since these types of engine are well-known, further descriptions of details of such engines are not necessary and therefore are not provided herein. Again, it is to be understood that the list of example engines above is not intended to be exhaustive and, further, that the invention is not intended to be limited to any particular verification engines.

While verification engines typically perform user verification by comparing user input to the user's model that was created when the user enrolled, the invention is not restricted to verification engines that require user enrollment. Unsupervised verification engines, that do not require the user to enroll, may also be used. When unsupervised verification engines are used, a single user model may be employed, including the user attributes as measured by the verification engines. For example, the following verification engines can be used: acoustic accent recognition, language identification, and face features detection (e.g., color of eyes, glasses detection). In this case, none of the individual verification engines require user enrollment, and one user model is used, stating the user's speech accent spoken, language, color of eyes, and whether he/she wears glasses.

Thus, the invention realizes that, while individual verification engines can be used to perform simple verification steps that operate in a predefined static manner, a more general framework is necessary when multiple verification objects are used to perform dynamic user authentication, in order to achieve a greater degree of accuracy and flexibility. The present invention provides such an improved authentication framework.

To accomplish this and other goals, the present invention introduces a notion of verification policies that govern the interaction between the user and the overall system, including the authentication system, and between the various verification engines. Any number of verification policies could be written to satisfy a wide variety of user-specific, transaction-specific or application-specific authentication needs, including needs that change in real-time.

As will be seen, such verification policies are managed by a verification policy manager which uses operations on a common context shared across all verification objects to achieve maximum programmability of the authentication system.

In one embodiment of the invention, the verification policies implement a finite state machine, operating on one or more verification objects. Starting from an initial state, transitions occur to other states as the various verification objects are manipulated, including terminal states where the user is accepted or rejected. In some cases, there may be multiple states that grant user acceptance, each with its own security levels (e.g., low security, medium security, high security, etc.) to address the changing security needs of the transaction being processed. The verification policy manager allows for new verification objects to be added at any time, by including the specifications of the new objects in a registry of verification objects, after which verification policies invoking the new verification objects may be utilized.

User models are typically created when a user enrolls in the system, using the inputs provided by the user (e.g., samples of voice, samples of fingerprint, answers to personal questions, etc.), or acquired through other means (details of past transactions, balance in most recent bill, serial number of a key or badge issued, encryption key contained in a smartcard or a client software, etc.).

The user models may be updated in real-time when needed, such as when a new bill is issued and the balance changes or when more voice samples are available. An individual user model contains information regarding all verification objects relevant to that user, including any user preferences related to the verification objects (e.g., a user may prefer questions regarding colors rather than numbers). User models also preferably support nontrivial manipulations of the verification objects, such as asking the user to add the first and third digits of his social security number. Again, any of the above-mentioned examples are not intended to limit the invention.

Given the above general description of some of the principles and features of the present invention, illustrative embodiments of these principles and features will now be given in the context of the figures.

Referring initially to FIG. 1, a block diagram illustrates a client-server architecture of an authentication system for implementing customizable verification using multiple verification objects, according to one embodiment of the invention. As shown, the authentication system 100 comprises a verification client device 102 and a verification server 104, coupled via a network adapter 106. The verification client 102 has context 108 and application 110 associated therewith. The verification server 104 comprises a verification policy manager 112 and a plurality of verification engines 114-1 through 114-N, where N can be any integer 2, 3, 4, . . . , and represents the number of verification object families or types that the particular implementation of the invention can support. The authentication system 100 further comprises a data manager 116, a verification objects store 118, a verification policies store 120 and a user models store 122. While the data manager 116 and data stores 118, 120 and 122 are shown outside of the verification server box, it is to be understood that they may be implemented on the verification server.

The verification client device 102 is responsible for interfacing with the user and collecting the inputs from the user, communicating with the verification server 104 through the network adapter 106, and communicating with the application 110. In one embodiment of the invention, the verification client device 102 is also responsible for acquiring and maintaining the context 108.

In an alternative embodiment, the context 108 may be stored on a central database (not shown), accessible by other components of the system 100. Such an implementation allows for a stateless operation between the verification client device 102 and the verification server 104, such that different servers could be used for different turns in the verification process, thereby providing protection against a particular server going down in the middle of a verification process, and also allowing for improved load balancing of the server resources.

The context 108 records all relevant variables for the verification process, such as: (1) the user name; (2) the current state in the verification policy that is in effect; (3) the history pertaining to the verification objects that have been invoked and the scores and outcomes associated with the invocations; (4) transaction-specific requirements (e.g., desired level of accuracy, nature of the transaction, etc.); (5) user-specific requirements (e.g., a user having a cold may prefer not to rely on voiceprint match, etc.); and (6) other physical and logical variables (e.g., type of network connection—remote or local, quality of a voice channel, etc.).

The context 108 may also record other variables that represent verification scores from external verification sources (not shown). For example, a customer entering a bank may have done so after swiping his bank card at the entrance, and that information could be included in the context 108 as an external score and be used for subsequent authentication processes at the counter or at the automated teller machine.

The variables initially included in the context 108 are system default variables relevant to the verification objects and other known requirements at the time of the initial build. However, as additional verification objects are added to the system 100 or as new requirements are discovered, user-defined variables may be added to the context 108.

The network adapter 106 enables communication between the client device 102 and the verification server 104. The network adapter 106 implements network transport protocols, such as the standard Transmission Control Protocol (TCP)/Internet Protocol (IP) or the Secure Sockets Layer (SSL) protocol. It is to be understood that in an embodiment where the authentication system 100 is implemented on a single computer system, a network adapter is not required.

As shown, the verification server 104 comprises a verification policy manager 112 and a set of verification engines 114-1 through 114-N. Each verification engine operates on a given verification object or a family (type) of verification objects. For example, a fingerprint verification engine may operate on a particular fingerprint or different types of fingerprints (e.g., thumbprint, index-fingerprint, etc.). Similarly, a knowledge verification engine may operate on different types of challenge-response questions.

The flexible architecture allows for easy addition of new verification engines and verification objects. Verification engines to be added could be of a new type or an existing type. For example, a face recognition engine could be added to a verification server that previously comprised voiceprint and fingerprint recognition engines, or a second voiceprint recognition engine (which could be from a different manufacturer, for example) could be added. Similarly, new verification objects could be added to new verification engines or existing verification engines (such as adding a new question to an existing knowledge verification engine).

The verification policy manager 112 interprets a verification policy for a given user model, and drives the entire authentication process. The policy manager 112 receives the current context 108 from the verification client device 102, operates on the context, incorporates updated status of current verification objects, and returns an updated context to the verification client device 102 along with the specification of the next step to be taken during the verification process.

In one embodiment of the invention, the verification policy manager 112 is responsible for invoking states in a finite state machine, interpreting the conditions of the state machine and branching to the next state. The verification policy manager 112 is the entity that makes the final accept or reject decision for the authentication process, and in some cases may also make intermediate decisions if the current transaction requires such decisions, provided the verification policy in effect permits it.

The data manager 116 component controls the external storage resources, including verification objects store 118, verification policies store 120 and user models store 122. These resources may be accessed directly by the verification server 104 (either by the verification policy manager 112 or by the individual verification engines 114-1 through 114-N). In an alternative embodiment, such resources may be accessed by the verification client device 102 and shipped to the verification server 104 through the network adapter 106.

The application 110 is the application for which user authentication is required prior to granting access. Example applications include banking applications, travel applications and e-mail applications. The application 110 is responsible for providing application-specific and transaction-specific information and requirements. It is to be understood that the invention is not limited to any particular application.

In one embodiment of the invention, the verification client device 102 communicates with the verification server 104 using an XML message interface. Example functions supported by the interface may comprise the following operations:

open a communication channel;
close a verification or enrollment session;
begin user enrollment and create a user model;
end user enrollment and close enrollment session;
start scoring a verification object;
end scoring a verification object;
start a verification session;
continue a verification session to determine the next state within policy or output decision;
add a new verification object;
add a new verification policy;
delete verification policies;
delete context;
update a verification object to make changes to an existing verification object;
update a user model to make changes to an existing user model;
update a verification policy to make changes to an existing verification policy;
query a user model to obtain information within a user model;
query a verification object to obtain information within a verification object;
query a verification policy to obtain information within a verification policy;
get a list of active verification objects;
add a context variable;
set the current value for a context variable;
get the current value for a context variable; and
get a list of all context variable and their current values.

It is to be understood that the above list of operations is not intended to be exhaustive, and that the invention is not limited to these particular example operations.

Further, in alternative embodiments, it is to be understood that the components associated with the verification server may themselves communicate with one another over the network adapter 106. Thus, for example, one or more of the verification engines 114 may communicate with the verification policy manager 112 over the network adapter 106. A similar distributed arrangement may exist with respect to the verification policy manager 112 and the data manager 116, and with the data manager 116 and the data stores 118, 120 and 122. Thus, it is to be understood that the interconnectivity of components shown in FIG. 1 is intended to be illustrative and, therefore, other suitable interconnections may be implemented to provide the authentication functionality of the present invention.

Figure 2:
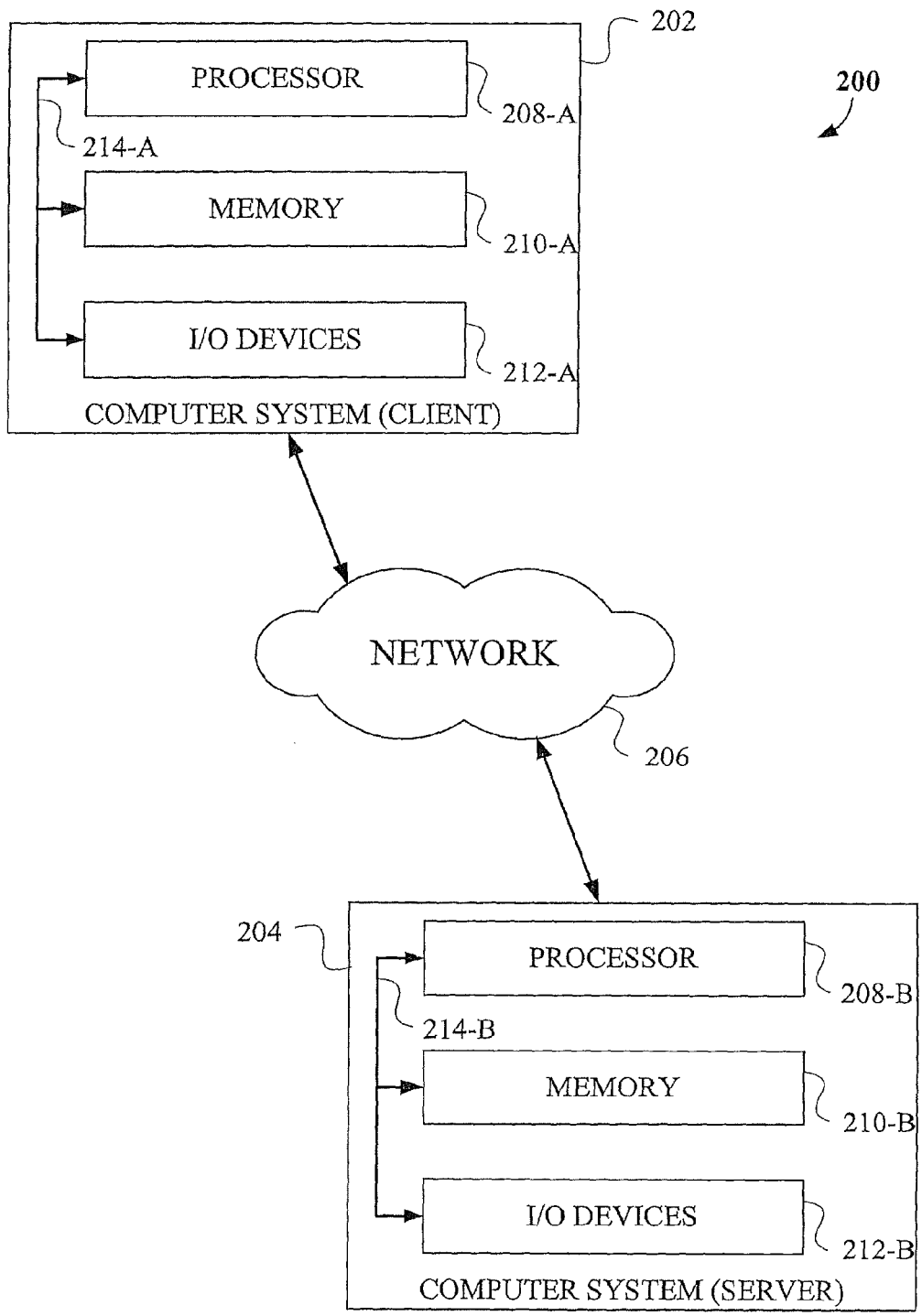
FIG. 2 is a block diagram illustrating an exemplary computing system environment for implementing customizable verification using multiple verification objects, according to one embodiment of the invention.

Referring now to FIG. 2, a block diagram illustrates an exemplary computing system environment for implementing customizable verification using multiple verification objects, according to one embodiment of the invention. By way of example, the computing system 200 may represent at least a portion of a distributed computing system wherein a user communicates via a computer system 202 (referred to illustratively as a "client" or client device) with another computer system 204 (referred to illustratively as a "server") via a network 206. The network may be any suitable network across which the computer systems can communicate, e.g., the Internet or Word Wide Web, local area network, etc. However, the invention is not limited to any particular type of network. In fact, it is to be understood that the computer systems may be directly linked without a network.

Further, while only two computer systems are shown for the sake of simplicity in FIG. 2, it is to be understood that the network may link a plurality of client devices and a plurality of servers. However, it is also to be appreciated that the techniques of the invention may be implemented on a single computer system wherein, for example, the user interacts directly with the computer system that performs the authentication operations.

With reference to FIG. 1, it is to be understood that the client device 102 may be implemented via computer system 202, and that the verification server 104 (and its components), the data manager 116 and the respective object, policy and user model stores (118, 120 and 122) may be implemented via the computer system 204. Network adapter 106 would therefore be implemented in accordance with network 206.

Thus, it is to be understood that FIG. 2 generally illustrates an exemplary architecture for each computer system communicating over the network. As shown, the computer system 202 comprises a processor 208-A, memory 210-A and I/O devices 212-A, all coupled via a computer bus 214-A. Similarly, the computer system 204 comprises a processor 208-B, memory 210-B and I/O devices 212-B, all coupled via a computer bus 214-B.

It should be understood that the term "processor" as used herein is intended to include one or more processing devices, including a central processing unit (CPU) or other processing circuitry. Also, the term "memory" as used herein is intended to include memory associated with a processor or CPU, such as RAM, ROM, a fixed, persistent memory device (e.g., hard drive), or a removable, persistent memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit. Further, the I/O devices associated with the computer system 202 are understood to include those devices necessary to collect the particular data associated with the verification objects supported by the authentication system, e.g., a microphone to capture voice data for voiceprint recognition and/or answers to questions posed, a speaker to output such questions to the user, a face scanner, an iris scanner, a fingerprint scanner, etc.

It is also to be understood that the client computer system illustrated in FIG. 2 may comprise a computer system programmed to implement the inventive techniques such as a personal computer, a personal digital assistant, a cellular phone, etc. Likewise, the server computer system illustrated in FIG. 2 may comprise a computer system programmed to implement the inventive techniques such as a personal computer, a microcomputer, a minicomputer, etc. However, the invention is not limited to any particular computer architecture.

Accordingly, software instructions or code for performing the methodologies of the invention, as described herein, may be stored in one or more of the associated memory devices, e.g., ROM, fixed or removable memory, and, when ready to be utilized, loaded into RAM and executed by the CPU.

Referring now to FIG. 3, an example is shown of a registry of verification objects. In this particular embodiment, the registry 300 is represented using XML and stored in the verification objects store 118 (FIG. 1).

The specification contains a description of all registered verification objects, which can be updated as new verification objects are added. The first object (302) in this example is the Date-of-Birth (DOB) object, which is of the type Question-Answer (QA) and the verification engine responsible for operating on this object is the knowledge verification engine. A suggested prompt may also be included to prompt the user for the required response when this object in invoked, but the prompt may be modified or replaced by the verification client, if necessary. The "perplexity" is a quantity that represents the difficulty associated with the verification object and may optionally be used by the verification policy manager in making verification decisions.

The second object (304) in this example is Caller-ID, which, in the case of a telephony connection, attempts to match the telephone number of the telephone originating the call with the telephone number in the relevant user model. No prompt is specified since this information may be obtained automatically from telephony infrastructure without any explicit input from the user.

The third object (306) in this example is the Voiceprint object, and in this case no type is specified, since the voiceprint verification engine operates on one type of verification object. Given that voiceprints are a biometric feature that may not be stolen, a high perplexity is specified in this example.

The fourth and fifth objects (308 and 310) illustrate the hierarchical nature of the specification, whereby the CAR_COLOR object inherits default properties from the parent object COLOR.

The last two objects (312 and 314) in this example are examples of dynamic verification objects, whereby the intended response changes dynamically, and in this example, the correct responses are obtained from the application, rather than from the user model. The current balance (CUR_BALANCE) object (312) is an application-specific object of the type numeric (APP_NUM) and the last transaction date (LAST_TRANSACTION_DATE) object (314) is an application-specific object of the type string.

Referring now to FIG. 4, an example is shown of a user model. In this particular embodiment, the user model 400 is represented using XML and stored in the user models store 122 (FIG. 1).

The user model contains a description of verification objects for which the user has provided enrollment data. The first object (402) is the Caller-ID object, for which this user's correct response is 914-945-3000 in this example. The user's preference for this object may be optionally included and used by the verification policy in selecting objects with higher preference when possible.

The second and third objects (DOB 404 and COLOR 406) are similar. The fourth object (color of car or CAR_COLOR 408) has two responses in this example, since this user has two cars and either response may be accepted as the correct answer. The fifth object (410) is the voiceprint object, for which model parameters are needed, which may be stored in a file, and the filename is included. The last two objects (CUR_BALANCE 412 and LAST_TRANSACTION_DATE 414) do not have any correct responses included because they are dynamic verification objects, and the current correct responses have to be obtained from the application.

As mentioned above, in accordance with the present invention, any of the objects can be updated or deleted in real-time, and new objects can be added in real-time.

Figure 6:
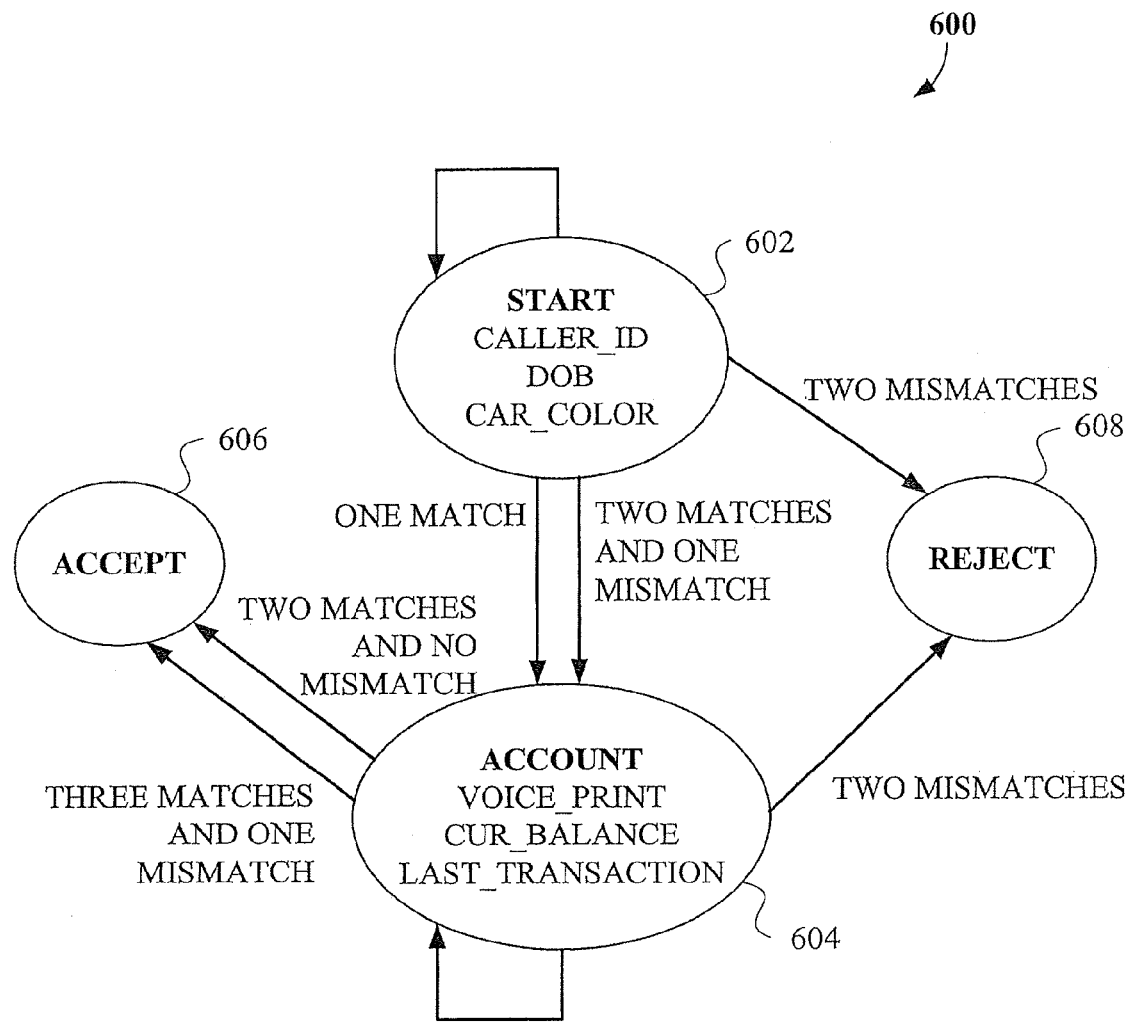
FIG. 6 is a state transition diagram illustrating state transition for the example verification policy of FIG. 5.

Referring now to FIG. 5, an example is shown of a verification policy. In this particular embodiment, the verification policy 500 is implemented as a finite state machine and represented using XML. The corresponding finite state machine diagram is shown in FIG. 6. The verification policy 500 is preferably stored in the verification policies store 120 (FIG. 1).

Verification policy 500 depicts a simple policy associated with a banking application. More particularly, the policy governs a situation where a user (presumably, a bank client) is trying to gain access to his/her bank account and the authentication system is verifying the identity of the user via multiple verification objects, such as the telephone number of the bank client, the bank client's date of birth, the color of the bank client's car, a voiceprint of the bank client, etc. However, as previously mentioned, the invention is not limited to any particular policy or application. The following illustrative description will make reference to line numbers (e.g., lines 1-53) located on the left-hand side of the verification policy 500.

First, in FIG. 5, context variables such as "curBalance" (line 4) and "lastTransactionDate" (line 6) are initialized with default values to handle dynamic verification objects such as "CUR_BALANCE" and "LAST_TRANSACTION_DATE". These variables will subsequently be updated using inputs from the application. The variable "minVoiceprintScore" (line 5) is used to specify the minimum score acceptable for the voiceprint match. The default value for this variable is specified by the verification policy. Different policies may have different default values (e.g., a stricter policy may have a higher minimum score). In an alternative embodiment, the default value may be overwritten by values obtained from either the user model (to account for user-specific requirements) or by the application (to account for transaction-specific or application-specific requirements).

Next, a set of conditions relevant to the policy are specified, which will be subsequently used to determine state transitions or evaluate verification objects. The expressions used to define the conditions may include context variables, numerical constants and string literals. The expressions may contain operations such as logical AND (&), logical OR (|), equal (=), not equal (!=), less than (<), less than or equal (<=), greater than (>), greater than or equal (>=), multiply (*), divide (/), add (+) and subtract (−).

For example, the condition "ONE_OK" (line 10), which is a condition used later to determine state transitions, is satisfied if the total number of verification objects invoked so far is one (_curObjectNum=1) and it was a match or there were no mismatches (_curWrongNum=0). Another example of a different kind is the condition "CUR_BALANCE_TEST" (line 15). This condition is used to evaluate the current balance ("CUR_BALANCE") verification object. In this case, a five percent error is allowed, for example, because an approximate answer is satisfactory.

Following the conditions, a set of states are defined. In this example, there are four states: ACCEPT (line 22), REJECT (line 24), START (line 27) and ACCOUNT (line 40). ACCEPT and REJECT are the terminal states where the final verification decision is made. START is the initial state and contains verification objects "CALLER_ID", "DOB" and "CAR_COLOR". By default, verification objects are selected at random, but relative weights may be specified optionally to modify the probability that an object may be selected. Transition to the ACCOUNT state occurs if one of the first two conditions (ONE_OK or TWO_OK_ONE_BAD) is satisfied, and transition to the REJECT state occurs if the third condition (TWO_BAD) is satisfied.

In the ACCOUNT state, no weights are specified, so all three objects have equal probability of being selected at random. Further, evaluating these objects requires different tests to be used, and these are selected from the previously defined list. Based on the conditions satisfied, transition to either the ACCEPT state or the REJECT state occurs and the corresponding final decision is sent to the verification client device 102 (FIG. 1).

In an alternative embodiment, intermediate decisions could be made at the intermediate states. For example, a decision to accept the user for low security transactions can be made if certain conditions are satisfied in the START state, and the final decision to accept the user for transactions can be made at the ACCEPT state.

Referring now to FIG. 6, a state transition diagram illustrates state transition for the example verification policy of FIG. 5. Thus, the state diagram 600 of FIG. 6 illustrates the four states associated with verification policy 500, namely, START (state 602), ACCOUNT (state 604), ACCEPT (state 606) and REJECT (state 608). The arrows between the states represent the conditions for transition between the states, as were described above in the context of verification policy 500 of FIG. 5.

Figure 7:
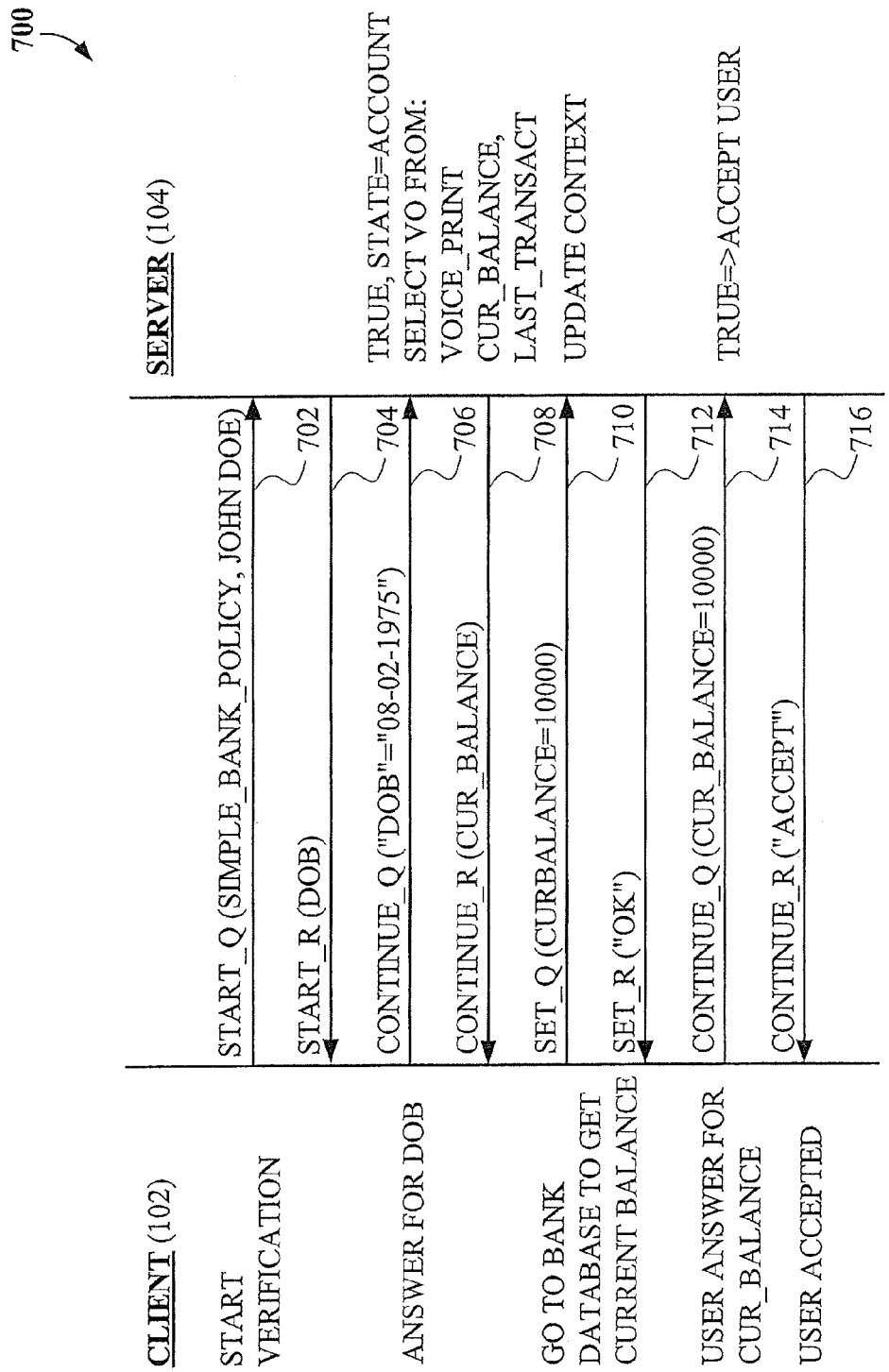
FIG. 7 is a flow diagram illustrating a verification session between a verification client device and a verification server for the example verification policy of FIG. 5.

Referring lastly to FIG. 7, a flow diagram illustrates a verification session between a verification client device and a verification server for the example verification policy of FIG. 5. For instance, such a verification session may take place between verification client device 102 and the verification server 104 of FIG. 1.

In one embodiment, there are three types of sessions (all of them involve opening and closing sessions):

(1) an administrative session where operations such as adding/updating/deleting policies, adding/updating/deleting objects, adding context variables, etc., are performed;

(2) an enrollment session where operations such as creating/updating/deleting user models, etc., are performed; and (3) a verification session where operations such as scoring verification objects, continuing a verification session and determining a next state, outputting a verification decision, updating/deleting context, setting/getting a value of a context variable, querying user models/verification objects/verification policies, etc., are performed.

The administrative session operations may be performed in accordance with an administrator of the authentication system via a client device or directly at the verification server. The enrollment and verification sessions may be performed in accordance with a user via a client device or directly at the verification server.

The flow chart of FIG. 7 depicts an example operation flow 700 for a verification session, given the verification policy 500 of FIG. 5.

As shown, in step 702, the client initiates the verification session with the server, stating the name of the policy (SIMPLE_BANK_POLICY) and the username (John Doe), with a default context. The server retrieves the policy and the user model referenced.

The server operates on the policy and the user model, and determines the first verification object to be invoked (DOB, in this example). The server updates the context and sends the request for that object and the context to the client, in step 704.

The client acquires the response to the invoked verification object ("DOB=08-02-1975"), and sends the response to a server, in step 706, along with the current context. As mentioned above, in an embodiment utilizing more than one server, the response need not be sent to the initial server, but rather it may be sent to another server in the authentication system. This is due to the stateless client-server nature of communication that may exist in such an embodiment.

The server (initial or other server) then scores the verification object, updates the context, determines the next state in the policy, and selects and sends the next verification object from the list of available objects (CUR_BALANCE, in this example) along with the updated context to the client, in step 708.

Since the CUR_BALANCE object is a dynamic object with frequently changing answers, the client updates the relevant context variable with the current value obtained from the application (curBalance=10000), in step 710. In step 712, the server returns acknowledgment to step 710.

The client acquires the response to the invoked verification object (CUR_BALANCE=10000), and sends the response to a server, in step 714, along with the current context.

The server then scores the verification object, determines that the policy has been satisfied, and outputs an "ACCEPT" decision, in step 716. The client then ends the verification session.

It is to be understood that an enrollment session and an administrative session would have respective request-response pairs between the client and the server that are particular to the operations performed in those sessions. It is to be further understood that in an embodiment where the authentication system is implemented on a single computer system, the user interacts directly with the single computer system in performing the operations associated with the particular session.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An automated method of user authentication implemented by at least one processor, the method comprising the steps of:
   obtaining user input, wherein at least a portion of the user input is associated with two or more verification objects;
   verifying the user based on the two or more verification objects in accordance with at least one verification policy operating on a context shared across the two or more verification objects; and
   updating the shared context based at least in part on at least one of the two or more verification objects,
   wherein updating the shared context comprises updating a history pertaining to the two or more verification objects invoked during the user verification step and updating outcomes associated with invocation of each of the two or more verification objects, and
   wherein the context comprises a finite state machine defining state transitions for the user input associated with two or more verification objects and the results associated with the user verification step in accordance with the at least one verification policy.

2. The method of claim 1, wherein the user verification step is performed in accordance with two or more verification engines which are respectively responsive to the two or more verification objects.

3. The method of claim 2, wherein the two or more verification engines respectively compare the two or more verification objects to at least one user model.

4. The method of claim 3, wherein the at least one user model is shared across the two or more verification objects.

5. The method of claim 3, wherein the at least one user model is previously generated based on data obtained in accordance with a user enrollment session.

6. The method of claim 1, wherein the shared context across the two or more verification objects comprises one or more variables associated with the two or more verification objects invoked during the user verification step.

7. The method of claim 6, wherein the one or more context variables represent one or more of: a user name; a current state in the at least one verification policy; application-specific requirements; user-specific requirements; and physical or logical variables.

8. The method of claim 1, wherein the two or more verification objects represent at least one of an object type that may be used to verify identity of the user, knowledge of the user, and possessions of the user.

9. The method of claim 1, further comprising the step of accepting at least one of the addition of, the modification of, and the deletion of at least one of a verification policy, a verification object type, a user model, and a variable associated with the shared context, for subsequent use in the user verification step.

10. A computing system for performing user authentication, comprising:
    a memory for storing program instructions; and
    at least one processor to execute the program instructions stored in the memory to implement automated steps of:
    obtaining user input, wherein at least a portion of the user input is associated with two or more verification objects;
    verifying the user based on the two or more verification objects in accordance with at least one verification policy operating on a context shared across the two or more verification objects; and
    updating the shared context based at least in part on at least one of the two or more verification objects,
    wherein updating the shared context comprises updating a history pertaining to the two or more verification objects invoked during the user verification step and updating outcomes associated with invocation of each of the two or more verification objects, and
    wherein the context comprises a finite state machine defining state transitions for the user input associated with two or more verification objects and the results associated with the user verification step in accordance with the at least one verification policy.

11. The computing system of claim 10, wherein the user verification step is performed in accordance with two or more verification engines which are respectively responsive to the two or more verification objects.

12. The computing system of claim 11, wherein the two or more verification engines respectively compare the two or more verification objects to at least one user model.

13. The computing system of claim 12, wherein the at least one user model is shared across the two or more verification objects.

14. The computing system of claim 12, wherein the at least one user model is previously generated based on data obtained in accordance with a user enrollment session.

15. The computing system of claim 10, wherein the shared context across the two or more verification objects comprises one or more variables associated with the two or more verification objects invoked during the user verification step.

16. The computing system of claim 15, wherein the one or more context variables represent one or more of: a user name; a current state in the at least one verification policy; application-specific requirements; user-specific requirements; and physical or logical variables.

17. The computing system of claim 10, wherein the two or more verification objects represent at least one of an object type that may be used to verify identity of the user, knowledge of the user, and possessions of the user.

18. The computing system of claim 10, further comprising the step of accepting at least one of the addition of, the modification of, and the deletion of at least one of a verification policy, a verification object type, a user model, and a variable associated with the shared context, for subsequent use in the user verification step.

* * * * *